(12) United States Patent
Barglof et al.

(10) Patent No.: US 7,667,620 B1
(45) Date of Patent: Feb. 23, 2010

(54) NETWORK ENABLED SURVIVAL TERMINAL

(75) Inventors: Mark W. Barglof, Marion, IA (US); Richard L. Robertson, Cedar Rapids, IA (US); Gunther B. Frank, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 364 days.

(21) Appl. No.: 11/701,666

(22) Filed: Feb. 2, 2007

(51) Int. Cl.
*G08B 21/00* (2006.01)
(52) U.S. Cl. .......................... 340/945; 340/963; 701/9; 701/213
(58) Field of Classification Search ................ 340/945, 340/963, 988; 701/9, 14, 213
See application file for complete search history.

(56) References Cited

U.S. PATENT DOCUMENTS

| | | | | |
|---|---|---|---|---|
| 5,710,559 A | * | 1/1998 | Krogmann | 340/963 |
| 5,894,285 A | * | 4/1999 | Yee et al. | 701/213 |
| 6,114,976 A | * | 9/2000 | Vian | 340/945 |
| 7,271,713 B2 | * | 9/2007 | Ayoub et al. | 340/963 |
| 2003/0034902 A1 | * | 2/2003 | Dickau | 340/945 |
| 2003/0065428 A1 | * | 4/2003 | Mendelson et al. | 701/9 |
| 2003/0225492 A1 | * | 12/2003 | Cope et al. | 340/945 |

* cited by examiner

*Primary Examiner*—John A Tweel, Jr.
(74) *Attorney, Agent, or Firm*—Daniel M. Barbieri

(57) ABSTRACT

In some embodiments, a search and rescue communication may include one or more of the following features: (a) a rescue terminal, (b) a main terminal operably connected to said rescue terminal across a communication network, said main terminal sends an emergency notification message across said communication network to said rescue terminal, and (c) a survival terminal associated with an ejection seat, said survival terminal being in communication with said main terminal, wherein said emergency notification message is delivered by said main terminal when said ejection seat is ejected.

14 Claims, 4 Drawing Sheets

NETWORK ENABLED SURVIVAL TERMINAL

FIELD OF THE INVENTION

Embodiments of the present invention relate to search and rescue terminals. Particularly, embodiments of the present invention relate to enhanced capabilities to rescue downed aircrews in emergencies. More particularly, embodiments of the present invention relate to a network enabled survival terminal that ensures downed aircrew communication with network-enabled terminals in their area.

BACKGROUND OF THE INVENTION

Personnel recovery has become an increasingly important mission area. Military planning options for recent world events have included deployment of combat search and rescue forces. In each instance, recovery assets were among the first to arrive for support of combat operations.

The USAF (United States Air Force) has been designated by the United States Department of Defense as the lead service for Combat Search and Rescue (CSAR). To meet the requirements of a lead service, the Air Force has equipped and trained specialized rescue forces to conduct CSAR.

The primary operational task of CSAR is to locate, contact, and recover downed aircrews. This primary task may be broken into three sub-tasks. The first sub-task includes locating the aircrew by visual or electronic search methods to pinpoint the aircrew's location and permit recovery. The second sub-task includes communicating with the downed aircrew by radio or visual signaling to conduct authentication. The third sub-task includes recovering the downed aircrew to return them to friendly control and, if necessary, providing medical assistance.

Additional, non-rescue specific, operational tasks that must be completed to accomplish the primary rescue task include: (1) provide personnel and equipment to train rescue mission ready personnel, (2) operate efficiently during peacetime, (3) airdrop rescue personnel and equipment, (4) configure rescue equipment for deployment, (5) provide self-protection for rescue assets, (6) conduct medical evacuation operations, (7) provide intelligence support directly to the rescue aircrew, (8) respond and prepare for rescue mission execution, (9) control alert and execute airborne rescue missions, and (10) support rescue sortie production.

The environments that rescue assets operate within can be adjusted by the use of supporting aircraft. Supporting aircraft providing air-to-air, air-to-ground, and Suppression of Enemy Air Defense (SEAD) coverage can degrade the threat, either temporarily or permanently, permitting rescue assets to enter the area and execute the recovery. Rescue forces may be augmented by these supporting systems depending on the threat environment, distance to the downed aircrew, and availability of assets.

A downed aircrew member's chance of survival diminishes rapidly after thirty minutes of being on the ground. Often the aircrew is injured and defenseless with limited communications capabilities. Currently, information distribution about a downed aircraft is relatively slow (in comparison to a networked approach) to filter through the command structure and reach an available asset that could recover the aircrew. Many times, a CSAR crew is standing by to respond to downed aircraft, but that particular CSAR asset may not be the closest asset to extract the downed aircrew. In some cases, ground troops or rotary wing aircraft in the area may provide emergency extraction without launching CSAR assets. However, due to interoperability issues, the ground or rotary wing assets may not be capable of communicating with the downed aircrew member. During training missions or low intensity conflicts, the CSAR assets may not be available for recovery and a "non standard" evacuation is necessary. Current survival radios require the user to load the current cryptographic keys into a radio and a prior knowledge of the channels used by adjacent units in the area.

Current survival systems used by the joint services are not network capable and rely on the downed aircrew member to establish communications with the CSAR elements via SATCOM (satellite communications), or for line of sight communications requires the cryptographic keys for that particular battle space and the specific channel being utilized by the unit in the area.

Therefore, it would be desirable to allow an aircrew to connect to a network centric combat search and rescue radio in an aircraft where the aircraft provides cryptographic keying and ensures the radio is prepared to communicate with the integrated network at any time.

SUMMARY OF THE INVENTION

In some embodiments, a search and rescue communication system may include one or more of the following features: (a) a rescue terminal, (b) a main terminal operably connected to said rescue terminal across a communication network, said main terminal sends an emergency notification message across said communication network to said rescue terminal, and (c) a survival terminal associated with an ejection seat, said survival terminal being in communication with said main terminal, wherein said emergency notification message is delivered by said main terminal when said ejection seat is ejected.

In some embodiments, a method of communicating search and rescue information may include one or more of the following steps: (a) sensing an ejection of an aircraft seat, (b) transmitting a survival message from the main terminal to a search and rescue network, (c) relaying the survival message through the network which the main terminal is operating, (for example Airborne Network, Global Information Grid, dedicated Combat Search and Rescue Network, TTNT, QNT, SRW, WNW etc.) to all units on that network, (d) securing the survival message utilizing cryptographic keys.

In some embodiments, search and rescue communication system may include one or more of the following features: (a) a communications network electronically coupling an aircrew, an aircraft, and a rescue unit, (b) a main terminal that transmits a survival message over the communications network based upon an aircraft emergency, (c) a survival terminal that relays an emergency ejection notification message to the main terminal upon the aircrew exiting the aircraft, (d) a network radio for use by the aircrew to communicate with the rescue unit.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
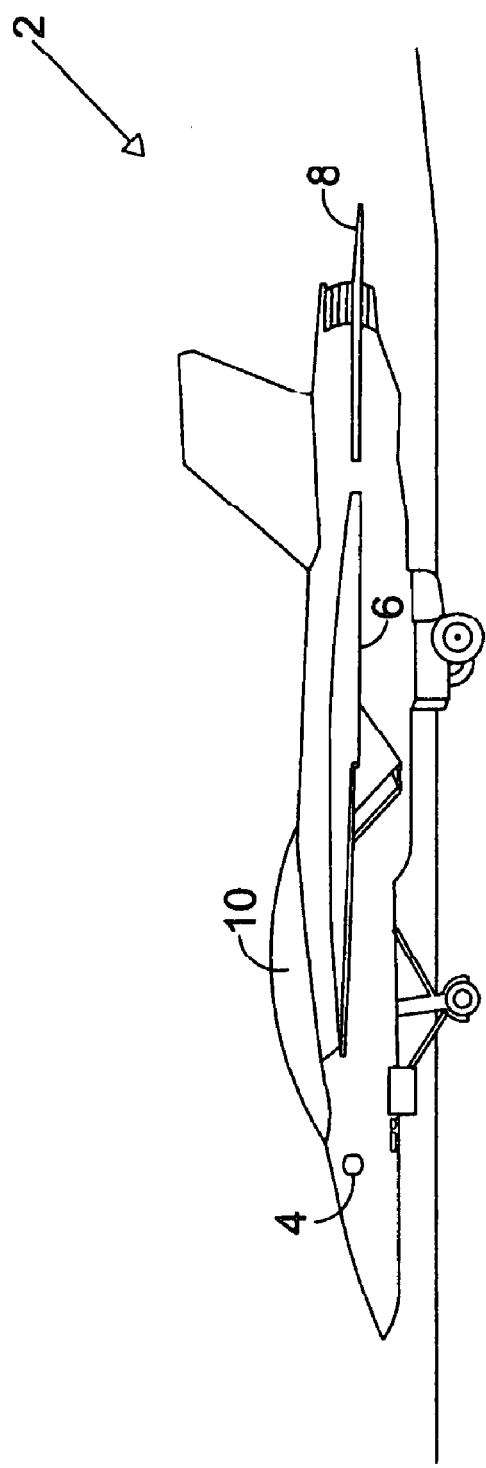
FIG. 1 is a side view of a fighter aircraft in an embodiment of the present invention.

Reference will now be made in detail to embodiments of the invention, examples of which are illustrated in the accompanying drawings.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention relate to network enhanced capabilities for downed aircrews in emergencies. A networking enabled survival terminal can ensure a downed aircrew can communicate immediately with network-enabled terminals in the area. Thus, the network in the area will quickly know the location of the downed aircrew, thus enable the search and rescue process to begin. This can be performed without human interaction immediately after ejection.

Embodiments of the present invention detail a survival terminal that can autonomously send crucial emergency information during the ejection process. The survival terminal may continue to send position updates over the network while the aircrew is on the ground and enables the aircrew to communicate with units on the ground and in the air. The survival terminal allows the downed aircrew to bring in and direct close air support missions. All of which may ensure the safe and expedient recovery of downed aircrews in combat and training missions. The survival terminal's network capability may be effective even if the pilot is incapacitated during the ejection process as is discussed in detail below.

The survival terminal may broadcast a Low Probability of Intercept/Low Probability of Detection (LPI/LPD) message in a default mode, ensuring that even incapacitated aircrew can send recovery information. The LPI/LPD mode can transmit with low power to maximize battery life. The survival terminal may also be capable of a full spectrum of connectivity provided by the network in higher power modes. Effectively the aircrew can direct close air support missions, and guide munitions providing unsurpassed defensive capabilities to the disadvantaged downed aircrew member.

Embodiments of the present invention may ensure seamless communications from the moment of ejection through the entire recovery process. During operation, the survival terminal may have all of the functions currently available to combat survival radios including: Over the Horizion (OTH) voice capabilities provided through SATCOM, LOS (line of sight) AM (amplitude modulation) and UHF (ultra high frequency) voice capabilities, SARSAT (search and rescue satellite aided tracking), and AM Beacon, and also provide the enhanced networking capabilities of embodiments of the present invention. The survival terminal may be a software-defined radio and feature:

LPI/LPD technology, and Tactical Targeting Network Technology-Small Form Factor (TTNT-SFF). All of which can be integrated into the survival terminal providing downed aircrews and CSAR personnel robust networking capabilities.

With reference to FIG. 1, a side view of a fighter aircraft in an embodiment of the present invention is shown. A modern fighter aircraft 2 includes a fuselage 4 having a pair of wings 6, a tail 8, and a transparent pilot canopy 10. While the description of the present invention is referenced to fighter aircraft 2, it is fully contemplated that embodiments of the present invention could be extended to any aircraft, including cargo planes, airliners, and business aircraft without departing from the spirit of the invention.

Figure 2:
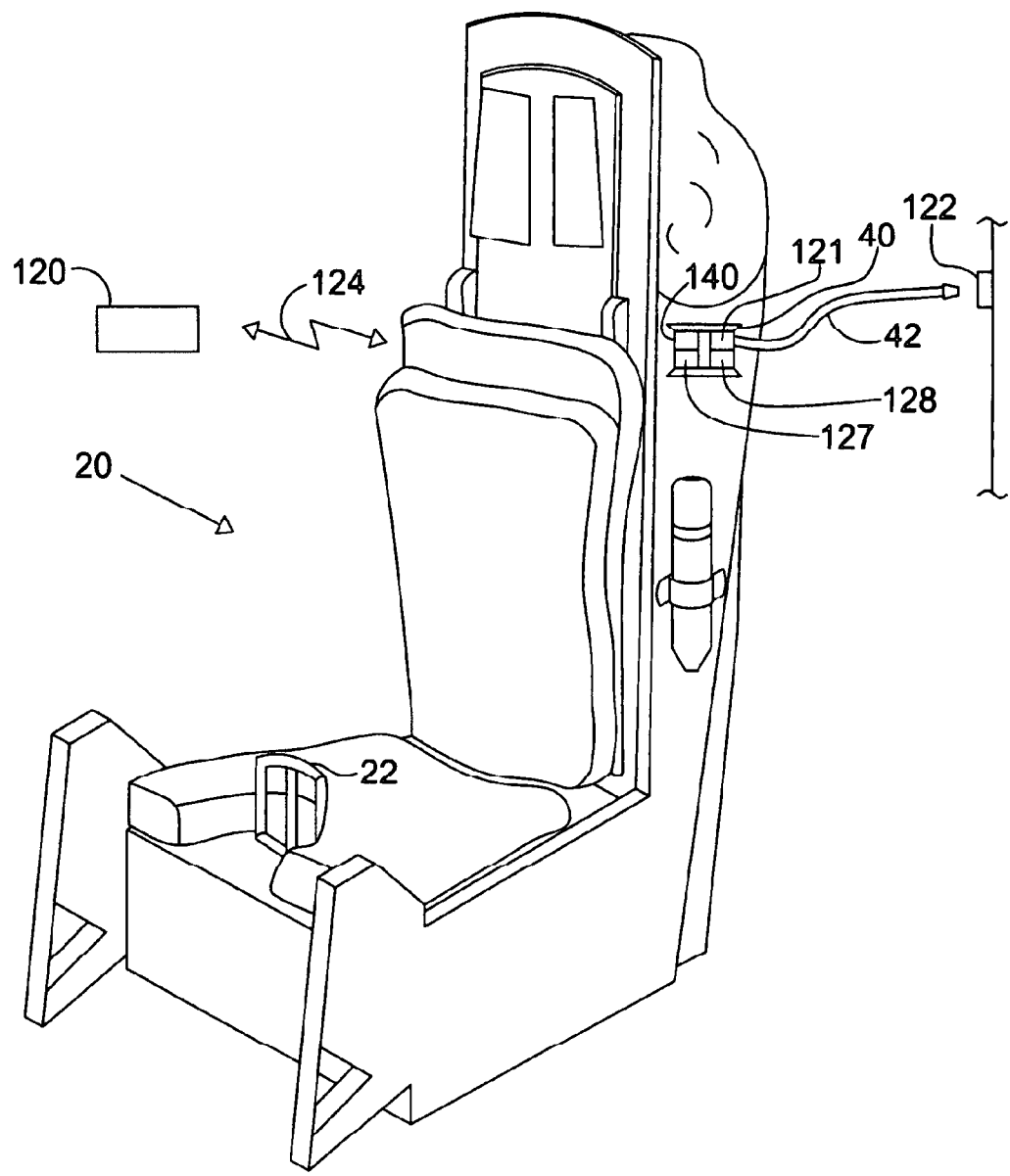
FIG. 2 is an isometric view of an ejection seat for an aircraft in an embodiment of the present invention.

With reference to FIG. 2, an isometric view of an ejection seat for an aircraft in an embodiment of the present invention is shown. It is important for many types of aircraft to have an ejection seat 20 in case aircraft 2 is damaged and the pilot has to eject to save his or her life. Ejection seats are complex pieces of equipment on any aircraft, and some include thousands of parts. The purpose of the ejection seat may be to lift the pilot out of the aircraft to a safe distance, then deploy a parachute to allow the pilot to land safely on the ground. It is fully contemplated that other methods of exiting an aircraft could be utilized without departing from the spirit of the invention.

Pulling an ejection handle 22 on seat 20 sets off an explosive cartridge in a catapult gun (not shown), launching ejection seat 20 out of aircraft 2 and into the air. As the seat rides up the guide rails (not shown), a leg-restraint system (not shown) is activated. These leg restraints are designed to protect the crewmember's legs from being caught or harmed by debris during the ejection. An underseat rocket motor provides the force that lifts the crewmember to a safe height.

Figure 3:
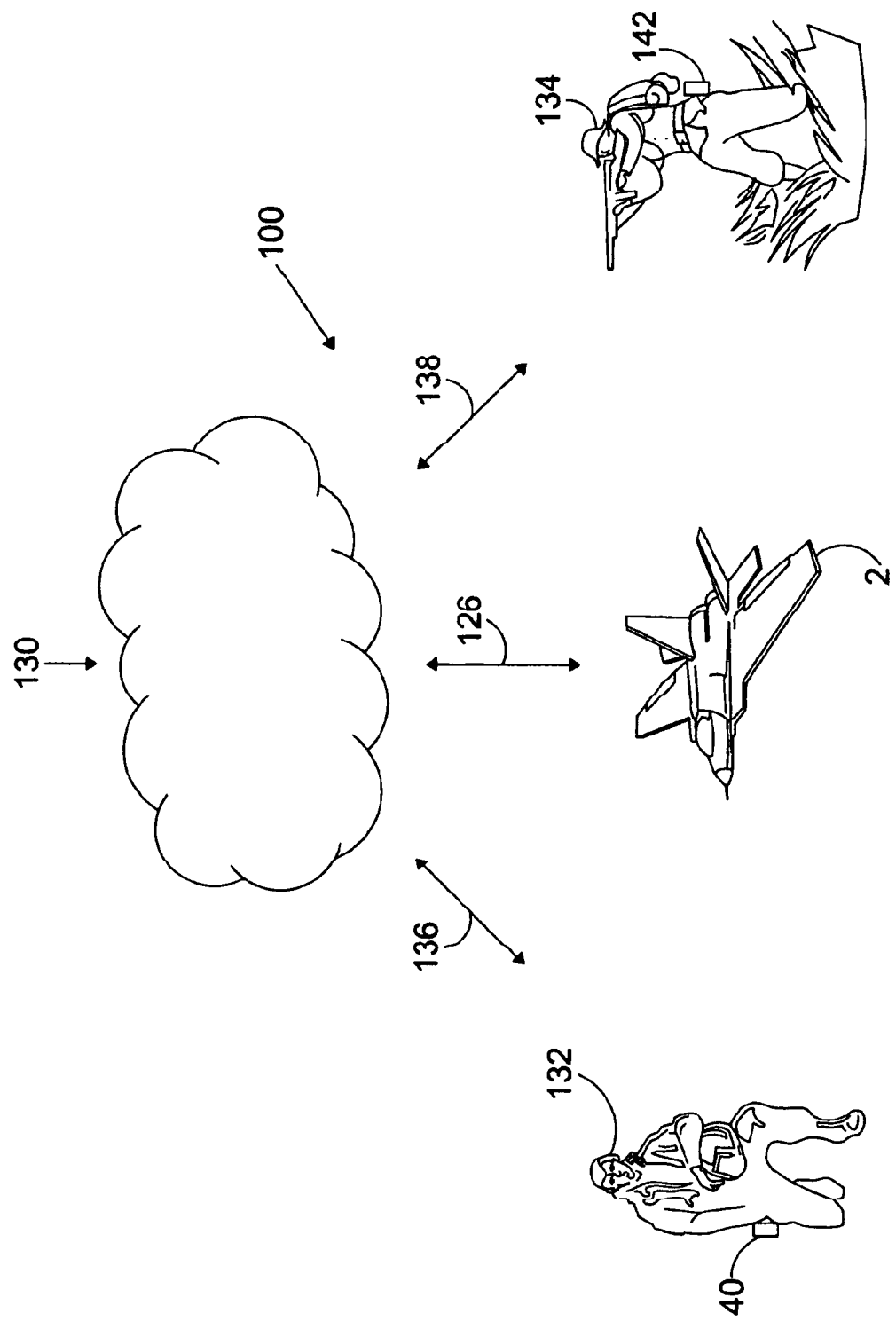
FIG. 3 is a diagram representing a network centric combat search and rescue radio technology in an embodiment of the present invention.

With reference to FIG. 3, a diagram representing a network centric combat search and rescue radio technology in an embodiment of the present invention is shown. While the detailed description is presented with reference to combat survival and rescue, it is fully contemplated that embodiments of the present invention could be extended to most any search and rescue situation. In embodiments of the present invention a survival terminal 40 (FIG. 2) may become an active participant on the tactical network 100 after the ejection process described above. Upon powering up of aircraft 2, survival terminal 40 may boot and become a passive participant on the tactical network 100 which the main terminal 120 is operating. In one embodiment, survival terminal 40 can have cryptographic keys 128 necessary to communicate with the tactical network 100 which the main terminal is operating. In another embodiment, the tactical network 100 which the main terminal 120 is operating may transmit updated keys to aircraft 2 and subsequently main terminal 120 upon powering. For purposes of the description, in one embodiment a main terminal 120 may continuously update GPS position to allow survival terminal 40 to be made aware of the aircraft's position without operator/pilot interaction.

During normal flight, survival terminal 40 may be attached to ejection seat 20 and may be connected through umbilical cord 42 to main terminal 120 within aircraft 2. Umbilical cord 42 may connect to main terminal 120 through main terminal data bus port 122. Main terminal bus port 122 could be any aircraft data bus without departing from the spirit of the invention. Further, the main terminal bus could be wireless without departing from the spirit of the invention. During flight, survival terminal 40 may continuously receive situational awareness and position updates, and load cryptographic keys as they change, from main network terminal 120. Through umbilical cord 42, survival terminal 40 may receive power to recharge the survival terminals batteries 127 as one embodiment.

Tactical Network 100 could comprise a communication system, within the Global Information Grid 130, or it may stand alone without direct connectivity with the Global Information Grid 130 which could be capable of reaching a downed airman or aircrew 132, and search and rescue or other units 134 that may be local to downed airman 132. It is fully contemplated that the Global Information Grid 130 consists of many types of communication systems, such as satellite communications or line of sight communications. In operation, when main network terminal 120 receives an indication of an ejection, all units 134 local to airman 132 may be notified quickly of the airman's distress. The operation of the tactical network 100 on which the main terminal 120 was also operating on prior to ejection is described in more detail below.

In one embodiment, a MEMs (micro-electro mechanical system) gravitational force (G-Force) sensor 140 could be integrated into survival terminal 40 where the G-force may be set to the minimum G loading of the aircraft's ejection or above maximum G-Force of the aircraft during combat missions (e.g., 10 G's). G-force sensor 140 could be used as a redundant trigger for umbilical 42 to ensure a false "ejection" message is not sent. Therefore, if G-force sensor 140 does not indicate an out of operating range G-force reading, then survival terminal 40 could not initiate a survival message 126. It is fully contemplated that other gravitational sensors and other sensor methods could be utilized to detect ejection or maximum G-Force without departing from the spirit of the invention.

In operation, upon ejection umbilical 42 and G-Force sensor 140 may trigger survival terminal 40 to send an "Emergency Ejection" notification 124 to main terminal 120. Notification 124 may instruct main terminal 120 to send a high priority message 126 with the highest amount of power afforded by the main terminal 120 supplied in aircraft 2. Message 126 may include the last known position, heading, velocity, and altitude of aircraft 2 upon ejection. Message 126 may be recognized over the tactical network 100 through an Organization Control Proxy (OCP) as the highest priority message possible and broadcast that message across the tactical network 100 to the closest search and rescue units 134. Another embodiment could have terminal 40 transmit the "ejection message" if the terminal 120 in aircraft 2 is unable to send survival message 126 due to being damaged or destroyed. In another embodiment, ejection of the ejection seat may trigger main terminal 120 to send the ejection notification to the tactical network 100 on which the main terminal is also operating on prior to ejection, and survival terminal 40 would listen for the ejection notification by main terminal 120. Failure to receive the ejection notification by main terminal 120 would trigger survival terminal 40 to transmit the ejection notification to the tactical network 100.

The information sent in initial message 126 will assist search and rescue crew 134 should survival terminal 40 be destroyed before sending the survival terminal's first position update. When ejection trigger 22 is activated, survival terminal 40 may become an active participant in the tactical network 100 as shown in FIG. 3. This change in status may be facilitated by cryptographic key loading preceding the flight of or during the flight of aircraft 2. Terminal 120 may broadcast over the tactical network 100 the aircraft's current position update, including speed, altitude, latitude, longitude, priority code (security based), and pilot identification information. In one embodiment, message 126 may be in a LPI/LPD waveform in order to prevent enemy detection. Terminal 120 may have frequency hopping functionality to prevent jamming by enemy forces. If the sequence of channel changes is not known to potential adversaries, spread-spectrum signals are highly resistant to deliberate jamming. Military radios may use cryptographic techniques to generate the channel sequence under the control of a secret transmission security key that the sender and receiver share. By itself, frequency hopping provides only limited protection against eavesdropping, so military frequency hopping radios often employ separate encryption devices such as the KY-57, or AN/CYZ-10 (ANCD Army, Navy Cryptographic Device). U.S. military radios that use frequency hopping include HAVE QUICK (a frequency-hopping system used to protect military UHF radio traffic) and SINCGARS (Single Channel Ground and Airborne Radio System).

Figure 4:
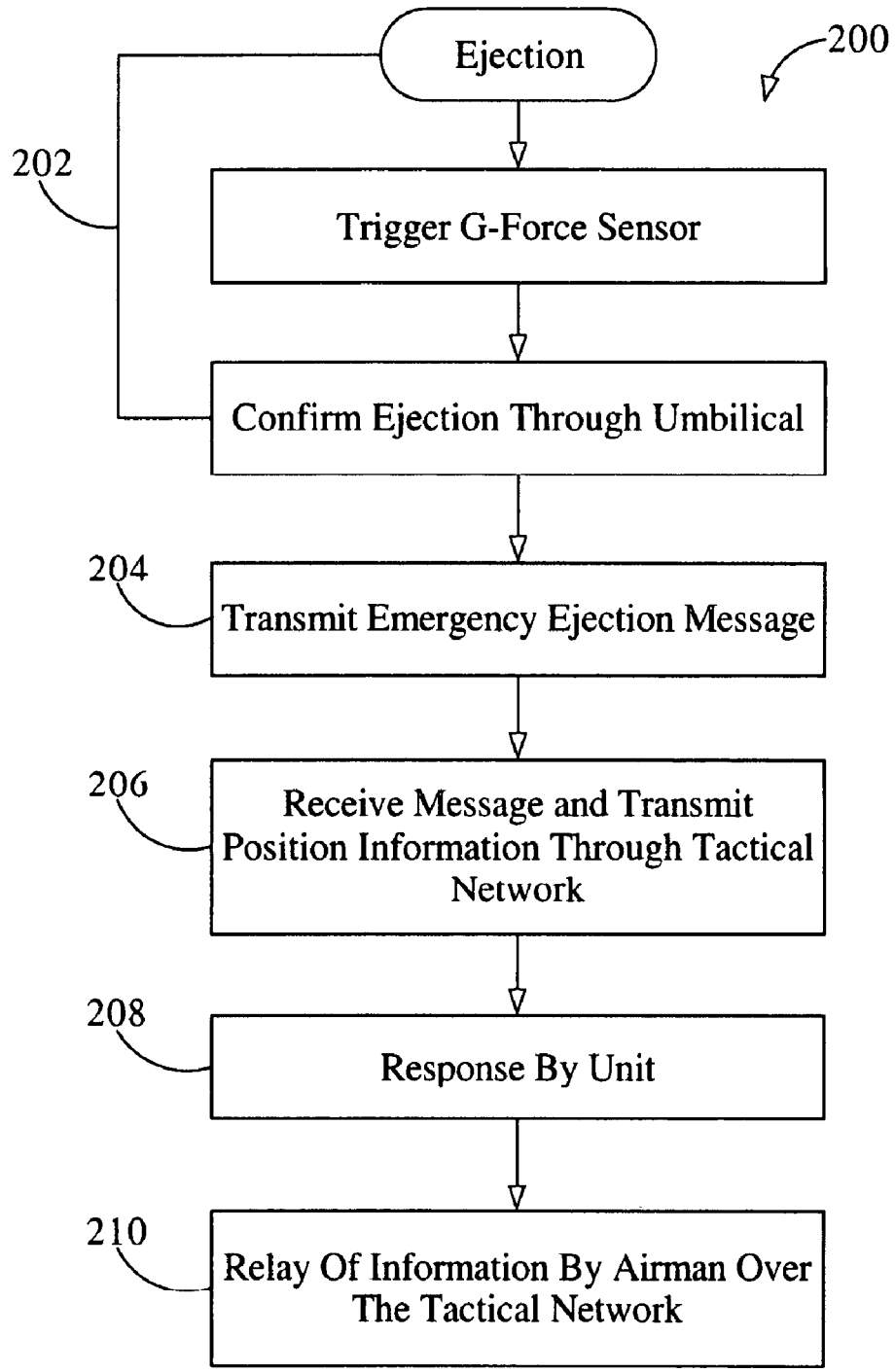
FIG. 4 is a flow chart diagram of the operation of a network centric combat search and rescue radio in an embodiment of the present invention.

With reference to FIG. 4, a flow chart diagram of the operation of a search and rescue process 200 in an embodiment of the present invention is shown. In operation, process 200 may begin at state 202 where an ejection from aircraft 2 occurs. G-force sensor 140 may be triggered and a disconnect of umbilical cord 42 confirms the ejection of seat 20. Upon disconnect of umbilical cord 42 from data bus port 122, main terminal 120 may begin transmitting "Emergency Ejection" (survival) message 126 at state 204. Emergency ejection (survival) message 126 would immediately alert all aircraft participating on the tactical network 100 of the emergency ejection. Because main terminal 120 has been operating on a tactical Network 100 prior to ejection and Survival Terminal 40 has been passively operating on the tactical network 100 on which the main terminal 120 was also operating, the Survival Terminal 40 will be loaded with all appropriate cryptographic keys and be ready to communicate with any aircraft within range that is participating on the tactical network 100.

After receiving all relevant location data from aircraft 2, airborne network 130 could then relay survival message 126 via transmission 138 to CSAR units and any other local non-CSAR units 134 should any other local units 134 be closer to downed airman 132 than a CSAR unit through the tactical network 100 at state 208. The closest and best CSAR unit 134 could then utilize the tactical network 100 or the Global Information Grid 130 to inform other units that it would be taking on the task of rescuing airman 132. This prevents several units responding to a distress call and thus maximizing the effective manpower. Additionally, airman 132 could transmit a message 136 to unit 134 over network 130 relaying information about a changing position, his(her) health, possible dangers, and calling in targeting information to better assist unit 134 at state 210. Upon ejection from aircraft 2, airman 132 could remove survival terminal 40 from the ejection seat and then survival terminal 40 becomes a network radio.

Embodiments of the present invention could provide extended capabilities over present fielded survival radios, such as MEMS G-force sensor 140 for verification of an ejection in coordination with disconnect of umbilical 42 may provide redundant safety measures to prevent a false ejection message on the network. Survival terminal 40 may be integrated with a global positioning system (GPS) 121 to facilitate navigation and position updates to tactical network 100. The GPS functionality could serve downed aircrew 132 during evasion as a navigational aid, used for network updates, and may facilitate in calling for close air support if needed.

Survival terminal 40 may communicate position updates over Global Information Grid 130 or over the tactical network 100 and may have the capabilities to form a UHF data flow link separate of network 130, which may reduce power requirements and extend battery life. Further, all messages sent from terminal 40 may be sent across network 130 as a high priority message and recognized by as highest priority. Any message sent from this family of terminals may be received by every terminal within range thus informing all network enabled terminals including rescue terminal 142, local to aircrew 132, as discussed above.

In operation, survival terminal 40 may operate in a default mode where survival terminal 40 may operate at a low data rate, which may be used to send position, pilot status, and small text messages such as "I am here, meet me there" messages. The low data rate may save on power and battery life. If necessary, for example in extreme circumstances, it may become a fully operational network terminal, however, battery life may be increased. Survival terminal 40 may only communicate over the tactical network 100 Without changing modes, survival terminal 40 may communicate over the Global Information Grid 130. Survival terminal 40 may automatically transmit position updates if it is "pinged" by a network enabled terminal operating on either tactical network 100 or Global Information Grid 130 when the terminals are within range of one another. When not in default mode, survival terminal 40 may be used like traditional CSAR radios communicating over VHF/UHF/SATCOM on emergency frequencies. In this mode, the difference is that the downed aircrew may have the cryptographic keys automatically loaded into the radio by tactical network 100 allowing him to communicate to units in the area. Therefore, if aircrew 132 knew that friendly forces, such as unit 134, were in the area and capable of finding downed aircrew 132, aircrew 132 could make survival terminal 40 fully operational at the risk of running out of battery life for the benefit of receiving close air support or receiving detailed messages about the rescue over the tactical network 100. Survival terminal 40 may have a "capture" mode that erases all memory and destroys the terminal 40 if capture by enemy forces is imminent. Survival terminal 40 may broadcast the final "Captured" message with final position onto tactical network 100, Global Information Grid 130 and over SATCOM at full power in the last several microseconds before capture.

In one embodiment, survival terminal 40 may transmit updates over tactical network 100 when it is "pinged" from another terminal, ensuring that transmissions are being received. This function will conserve battery life and reduce the downed aircrews RF signature to the enemy. Thus, as unit 134 moves closer to aircrew 132, unit 134 could "ping" survival terminal 40. Upon which, messages inputted by aircrew 132 could be sent to unit 134. This would reduce battery consumption and reduce the ability for the enemy to detect aircrew 132 by signal detection. In another embodiment, terminal 40 could have Voice over IP (VoIP) capabilities for line of sight voice communications over tactical network 100, or over Global Information Grid 130.

As discussed above, survival terminal 40 may have integrated SATCOM capabilities. SATCOM cryptographic keys 128 may be automatically loaded into survival terminal 40 after the initial bootup of main terminal 120.

Survival terminal 40 may float and when immersed and may be able to transmit after being immersed for use during an open water ejection, or for use by special operations forces who may be required to conduct underwater operations such as infiltration or exfiltration. Survival terminal 40 may give the user a distinct advantage over present systems. Survival terminal 40 may give downed aircrew 132 the same communications ability on the ground as they have when in the air. With survival terminal 40, downed aircrew 132 may be coordinating their recovery before they even hit the ground.

It is believed that the present invention and many of its attendant advantages will be understood by the aforementioned description. It is also believed that it will be apparent that various changes may be made in the form, construction, and arrangement of the components thereof without departing from the scope and spirit of the invention or without sacrificing all of its material advantages. Features of any of the variously described embodiments may be used in other embodiments. The form herein before described being merely an explanatory embodiment thereof. It is the intention of the following claims to encompass and include such changes.

What is claimed is:

1. A search and rescue communication system, comprising:
   a rescue terminal;
   a main terminal operably connected to said rescue terminal across a communication network, said main terminal sends an emergency notification message across said communication network to said rescue terminal;
   a survival terminal associated with an ejection seat, said survival terminal being in communication with said main terminal via an umbilical cord; and
   a G-force sensor operably coupled to the survival terminal, wherein said emergency notification message is delivered by said main terminal when said G-force sensor senses gravity forces above a predetermined limit and said umbilical cord is disconnected.

2. The search and rescue communication system of claim 1, wherein the rescue terminal in a localized area receives the emergency notification message.

3. The search and rescue communication system of claim 2, wherein said emergency notification message includes location information.

4. The search and rescue communication system of 3, wherein said survival terminal is operable to communicate with said rescue terminal across said communication network after ejection.

5. The search and rescue communication system of claim 4, wherein the rescue terminal communicates with said survival terminal to retrieve additional location information.

6. A method of communicating search and rescue information, the steps comprising:
   transferring cryptographic keys to a survival terminal, said survival terminal being associated with an aircraft seat;
   communicatively connecting said survival terminal to a main terminal via an umbilical cord, said main terminal being operably connected to said rescue terminal across a communication network;
   sensing an ejection of said aircraft seat via measuring G-forces above a predetermined limit and sensing said umbilical cord is disconnected; and
   transmitting an emergency notification message across a communication network when said ejection is detected, wherein said survival terminal is operable to communicate across said communication network after ejection of said aircraft seat.

7. The method of claim 6, wherein said cryptographic keys allows said survival terminal to access said communication network.

8. The method of claim 6, wherein the emergency notification message includes location information at a time of transmission of the emergency notification message.

9. The method of claim 8, wherein the location information includes latitude, longitude, altitude, and pilot data.

10. A search and rescue communication system, comprising:
    a rescue terminal;
    a main terminal, associated with an aircraft, said main terminal operably connected to said rescue terminal across a communication network, said main terminal sends an emergency notification message across said communication network to said rescue terminal;
    a survival terminal associated with an ejection seat of said aircraft, said survival terminal being in communication with said main terminal via an umbilical cord when said aircraft seat is located within said aircraft, wherein said emergency notification message is delivered by said main terminal when said ejection seat is ejected; and
    a G-force sensor operably coupled to the survival terminal, wherein said emergency notification message is delivered by said main terminal when said umbilical cord is disconnected and said G-force sensor senses gravity forces above a predetermined limit.

11. The search and rescue communication system of claim 10, wherein the rescue terminal in a localized area receives the emergency notification message.

12. The search and rescue communication system of claim 11, wherein said emergency notification message includes location information.

13. The search and rescue communication system of 12, wherein said survival terminal is operable to communicate with said rescue terminal across said communication network after ejection.

14. The search and rescue communication system of claim 13, wherein the rescue terminal communicates with said survival terminal to retrieve additional location information.

\* \* \* \* \*